(12) United States Patent
Andrews et al.

(10) Patent No.: US 7,574,938 B2
(45) Date of Patent: Aug. 18, 2009

(54) BACKUP ALIGNMENT SYSTEM FOR AN INTERNAL MODE SWITCH

(75) Inventors: Kenneth M. Andrews, Greenwood, IN (US); Shaun A. Wilhelm, Indianapolis, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 194 days.

(21) Appl. No.: 11/733,426

(22) Filed: Apr. 10, 2007

(65) Prior Publication Data

US 2008/0250890 A1 Oct. 16, 2008

(51) Int. Cl.
*B60K 17/04* (2006.01)
(52) U.S. Cl. ............... 74/473.12; 74/473.25; 74/473.36
(58) Field of Classification Search .............. 74/473.25, 74/473.26, 473.35, 473.12, 473.1, 470
See application file for complete search history.

(56) References Cited

U.S. PATENT DOCUMENTS

| | | | | |
|---|---|---|---|---|
| 6,431,339 B1 * | 8/2002 | Beattie et al. | ............ | 192/220.4 |
| 6,865,967 B2 * | 3/2005 | Shioji et al. | .............. | 74/473.23 |

\* cited by examiner

*Primary Examiner*—David M Fenstermacher

(57) ABSTRACT

A gear selector assembly includes a selector shaft, an internal mode switch mounted on the selector shaft, and a detent lever mounted on the selector shaft and rotatable with the selector shaft. The detent lever is indexed relative to the internal mode switch. A spring assembly is in engagement with the detent lever. The spring assembly has a first member that engages the internal mode switch to prevent the internal mode switch from rotating and has a second member that engages the internal mode switch to prevent the internal mode switch from rotating if the first member does not engage the internal mode switch.

12 Claims, 4 Drawing Sheets

BACKUP ALIGNMENT SYSTEM FOR AN INTERNAL MODE SWITCH

FIELD

The present disclosure relates to internal mode switches, and more particularly to a backup alignment system for an internal mode switch.

BACKGROUND

The statements in this section merely provide background information related to the present disclosure and may or may not constitute prior art.

In conventional motor vehicles, an operator actuates a mechanical shifting lever to select one of a plurality of forward and reverse transmission gear ratios. The mechanical position of the shifting lever is converted to an electronic signal that is communicated to the transmission by an internal mode switch. A typical internal mode switch includes a plate or lever having a plurality of detents, each detent corresponding to one of neutral, park, and the plurality of forward and reverse gear ratios. A roller assembly engages these detents and helps to locate the plate such that the internal mode switch can detect which of the forward and reverse gear ratios has been selected by the operator of the motor vehicle. While useful for its intended purpose, there is room in the art for an improvement to the internal mode switch to provide a backup alignment system that acts as a redundant system to the roller assembly.

SUMMARY

The present invention provides a gear selector assembly having a selector shaft, an internal mode switch mounted on the selector shaft, and a detent lever mounted on the selector shaft and rotatable with the selector shaft. The detent lever is indexed relative to the internal mode switch. A spring assembly is in engagement with the detent lever. The spring assembly has a first member that engages the internal mode switch to prevent the internal mode switch from rotating and has a second member that engages the internal mode switch to prevent the internal mode switch from rotating if the first member does not engage the internal mode switch.

In one aspect of the present invention the first member engages a first slot formed on the internal mode switch.

In another aspect of the present invention the second member engages a second slot formed on the internal mode switch.

In yet another aspect of the present invention the second member has a width less than a width of the first member.

In yet another aspect of the present invention the second slot has a width greater than a width of the first slot.

In yet another aspect of the present invention the first slot and the second slot are formed on a flange extending out from the internal mode switch.

In yet another aspect of the present invention the first slot and second slot extend from an edge of the flange toward the internal mode switch.

In yet another aspect of the present invention the second member is a rectangular tab.

In yet another aspect of the present invention the first member is a pin.

In yet another aspect of the present invention the spring assembly includes a pair of arms and the first member and second member extend out from a side of one of the pair of arms.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
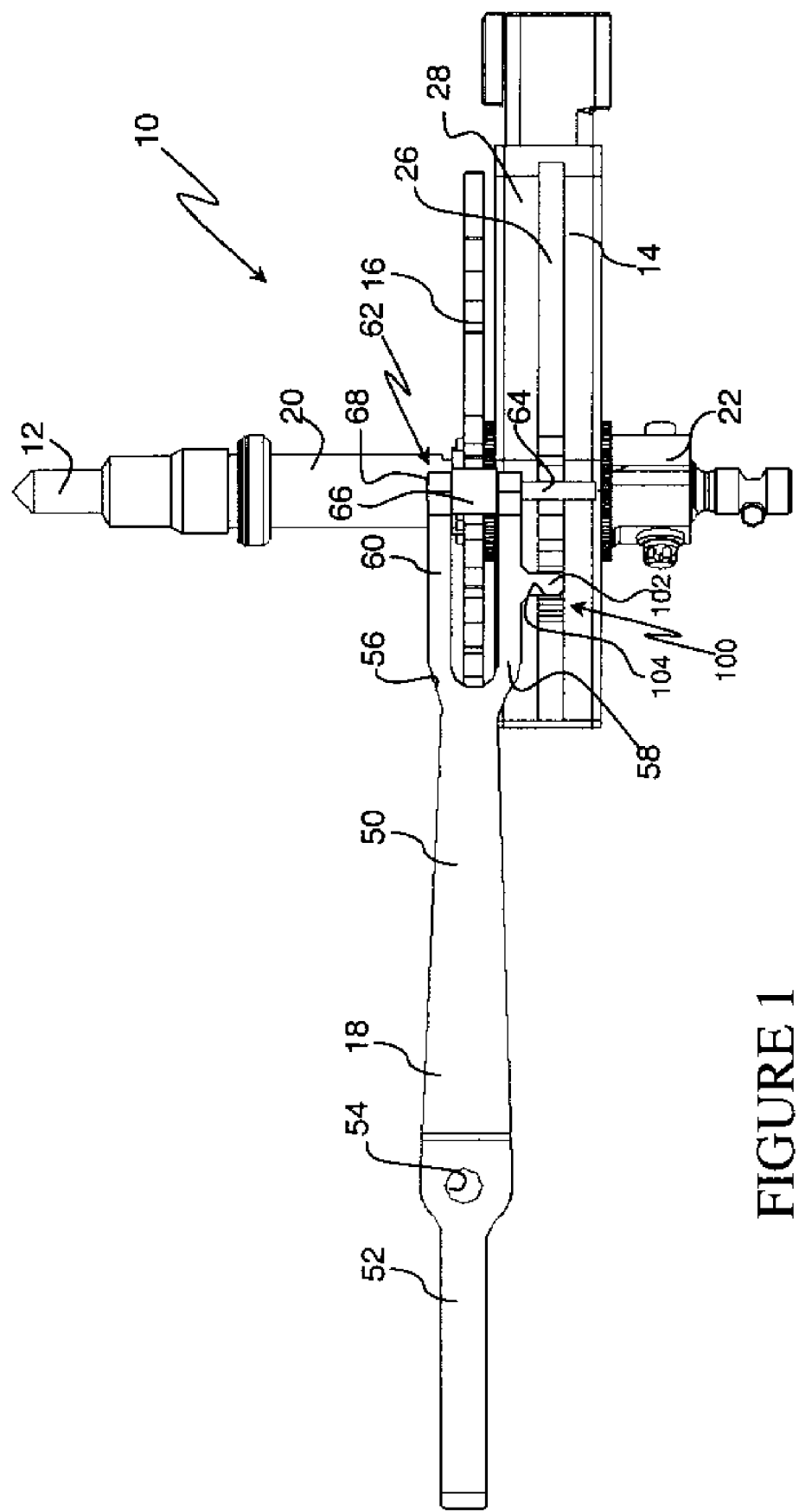
FIG. 1 is a bottom plan view of an internal mode switch assembly having a backup alignment system according to the principles of the present invention.
Figure 2:
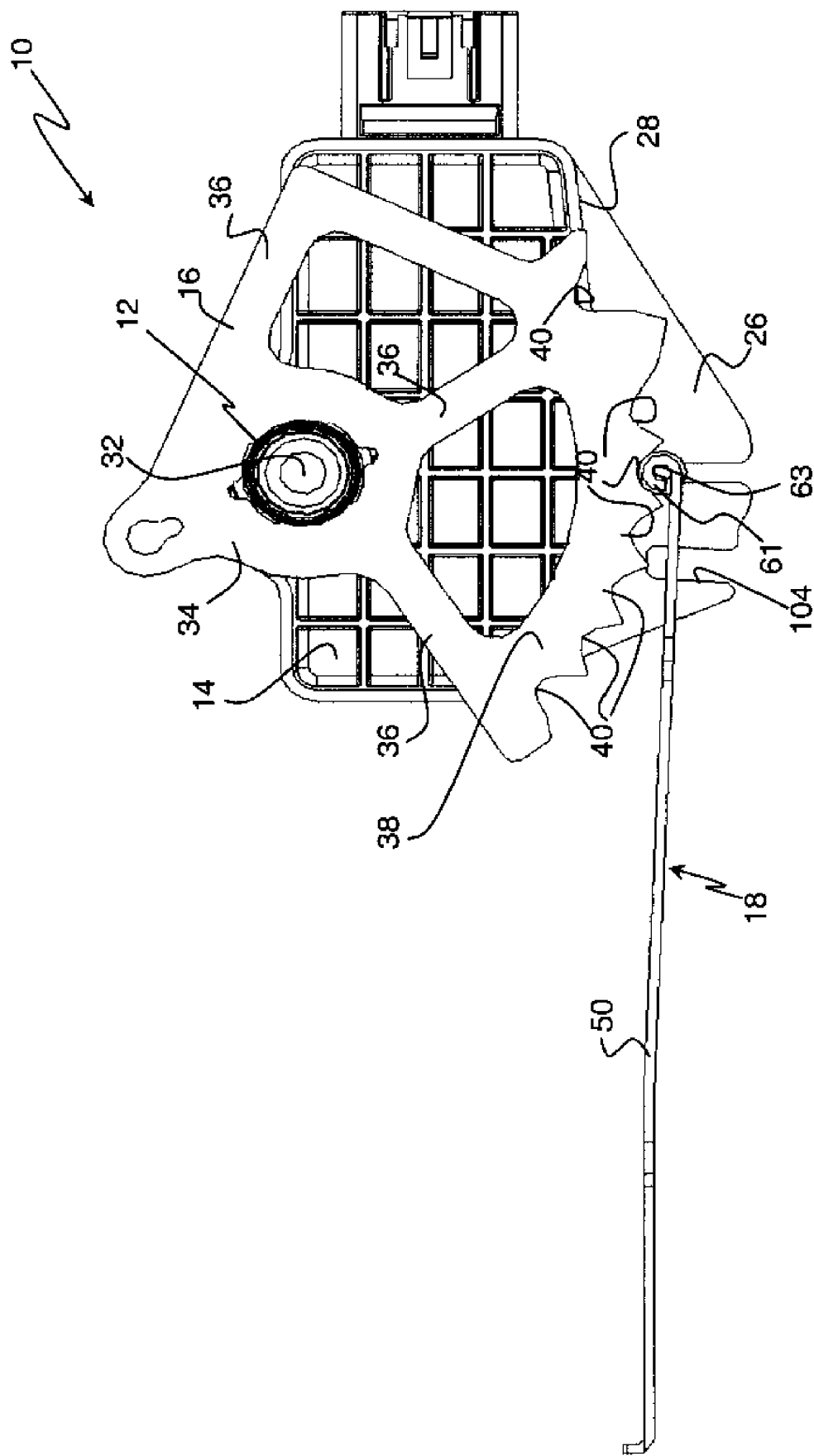
FIG. 2 is a side elevational view of the internal mode switch assembly of the present invention.

With combined reference to FIGS. 1 and 2, a gear selector assembly is generally indicated by reference number 10. The gear selector assembly 10 is preferably employed in a motor vehicle (not shown) having an automatic transmission (not shown). The gear selector assembly 10 generally includes a selector shaft assembly 12, an internal mode switch (IMS) housing 14, a detent lever 16, and a spring assembly 18. The IMS housing 14 is employed to detect which of a set of gear selections has been selected by an operator of the motor vehicle by electronically reading the position of the detent lever 16, as will be described in further detail below.

The selector shaft assembly 12 is coupled to a range selector (not shown) that is manually operable to select one of a plurality of forward and reverse transmission gear ratios. The selector shaft assembly 12 includes a selector shaft 20 capped at one end thereof by a collapsible collar 22 and capped at an opposite end by the transmission housing (not shown).

The IMS housing 14 is mounted on the selector shaft assembly 12 between the collapsible collar 22 and the transmission housing (not shown). The IMS housing 14 includes a flange 26 that extends out from a bottom surface 28 of the IMS housing 14. The flange 26 includes a slot 30 that extends from an outer edge of the flange 26 towards the bottom surface 28 of the IMS housing 14.

The detent lever 16 is also mounted on the selector shaft assembly 12 and thus rotates or pivots about the axis of the shaft assembly 12 indicated by reference number 32. The detent lever 16 is located along the selector shaft 20 between the IMS housing 14 and the transmission housing (not shown). The detent lever 16 includes a center portion or hub 34 generally concentrically disposed about the axis point 32. A plurality of spokes or arms 36, three in the example provided, extend out from the hub 34. An outer arcuate section 38 connects the ends of the arms 36. A plurality of detents 40 are formed on an outer edge of the outer section 38. The position of each of the plurality of detents 40 corresponds to an indexed position of the detent lever 16 relative to the IMS housing 14. Each indexed position in turn corresponds to one of a forward or reverse gear ratios, park, or neutral. In an automatic transmission, these gear ratios may include park, neutral, reverse, and drive as well as other specific gear ratios such as first gear and second gear. As will be described in greater detail below, the detent lever 16 cooperates with the IMS housing 14 to translate rotation of the selector shaft assembly 12 into an electronic gear selection.

The spring assembly 18 includes a spring arm 50 that is coupled at a first end 52 to a valve body (not shown) of the transmission (not shown). The first end 52 includes a bolt hole 54 sized to receive a bolt (not shown) to assist in coupling the spring arm 50 to the valve body. The spring arm 50 further includes a second end 56 opposite the first end 52. The second end 56 is bifurcated and defines a first arm 58 and a second arm 60. The arms 58 and 60 are spaced apart and extend parallel to one another such that they cooperate with the spring arm 50 to give the second end 56 a forked shape. The arms 58 and 60 each include ends 61 that curved inward to define pin holes 63 (best seen in FIG. 2).

The spring assembly 18 further includes a roller assembly 62 mounted to the second end 56 of the spring arm 50. More specifically, the roller assembly 62 includes a pin 64 and a roller 66. The pin 64 is mounted within the pin holes 63 of the first and second arms 58 and 60. The roller 66 is rotatably mounted on the pin 64 and is positioned between the first arm 58 and the second arm 60.

The spring assembly 18 is used to align or locate the detent lever 16 relative to the IMS housing 14 and to keep the IMS housing 14 from excessive movement. Accordingly, the roller 66 is positioned such that it may engage the detents 40 formed on the outer section 38 of the detent lever 16. Also, the spring assembly 18 is positioned relative to the IMS housing 14 such that the pin 64 extends out from the first arm 60 and into the slot 30 formed in the flange 26.

The gear selector assembly 10 further includes a backup alignment system generally indicated by reference number 100. The backup alignment system 100 includes a tab 102 that cooperates with a secondary slot 104 to act as a backup to the roller assembly 62. The tab 102 is located on the first arm 58 of the spring assembly 18. The tab 102 is generally rectangular having a thickness approximately equal to a thickness of the first arm 58. The tab 102 has a length sufficient to extend at least partially within the secondary slot 104. The secondary slot 104 is disposed on the flange 26 and extends from an outer edge of the flange 26 towards the bottom surface 28 of the IMS housing 14. The tab 102 extends out from the first arm 58 towards the flange 26 and extends into the secondary slot 104. In an alternate embodiment, a balancing tab may be formed on the second arm 60 that has the same mass as the tab 102 in order to keep the spring assembly 18 balanced. In another embodiment, the tab 102 may have rounded edges in order to reduce the mass and material of the tab 102.

Figure 3A:
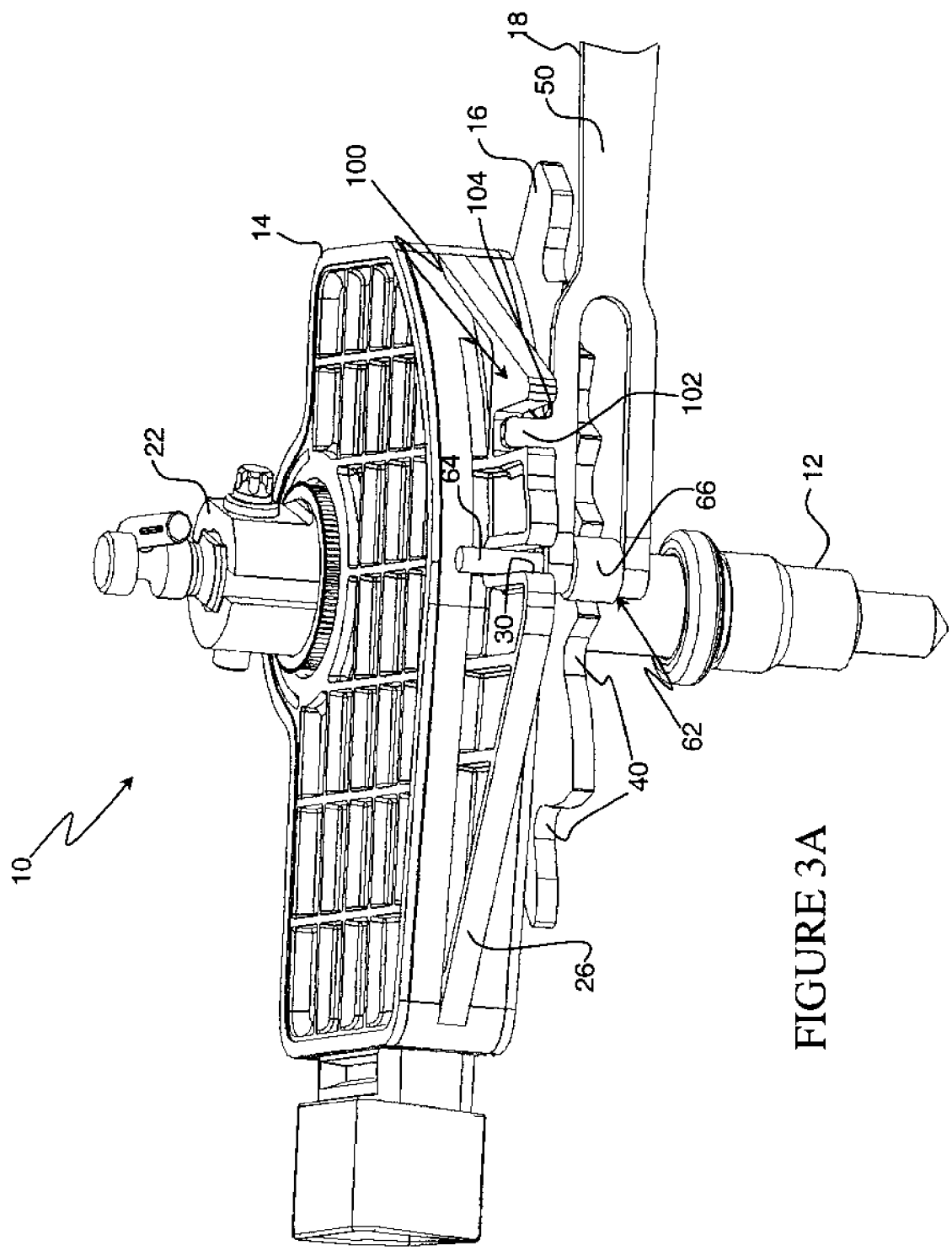
FIG. 3A is an enlarged, isometric, bottom view of the internal mode switch of the present invention during normal conditions.

Turning now to FIG. 3A, the normal mode of operation of the gear selector assembly 10 will be described. An operator of the motor vehicle (not shown) actuates a manual mechanical range selector (not shown) to select a desired gear ratio. Actuation of the range selector (not shown) rotates the selector shaft assembly 12. The selector shaft assembly 12 in turn rotates the detent lever 16. As the detent lever 16 is rotated, the roller 66 mounted at the end of the spring arm 50 rolls along the detents 40 of the detent lever 16. The bias of the spring arm 50 towards the detent lever 16 keeps the roller 66 in contact with the detent lever 16. The outer section 38 of the detent lever 16 moves the roller 66 and spring arm 50 away from the IMS housing 14 against the spring bias of the spring arm 50 when the roller 66 is positioned between detents 40. When the roller 66 is positioned within a detent 40, the spring arm 50 exerts less force against the detent lever 16. In this way the spring assembly 18 operates to align the detent lever 16 with respect to the IMS housing 14 using the detents 40 by providing tactile feedback to the operator of the motor vehicle (not shown) when the range selector (not shown) has been aligned with a desired gear selection. Then, the IMS housing 14 is able to electronically read the alignment of the detent lever 16 and can convert the position of the detent lever 40 into an electronic signal that can be communicated to the transmission (not shown). As the spring assembly 18 is moved by the rotating detent lever 16, the pin 64 is allowed to move within the slot 30 while simultaneously keeping the IMS housing 14 from rotating or moving, which would affect the ability of the IMS housing 14 to electronically read the position of the detent lever 16. During normal operation it is important that the backup alignment system 100 does not interfere with the interaction of the pin 64 with the slot 30. Accordingly, the tab 102 has a width less than the diameter of the pin 64 and/or the secondary slot 104 has a width greater than a width of the slot 30.

Figure 3B:
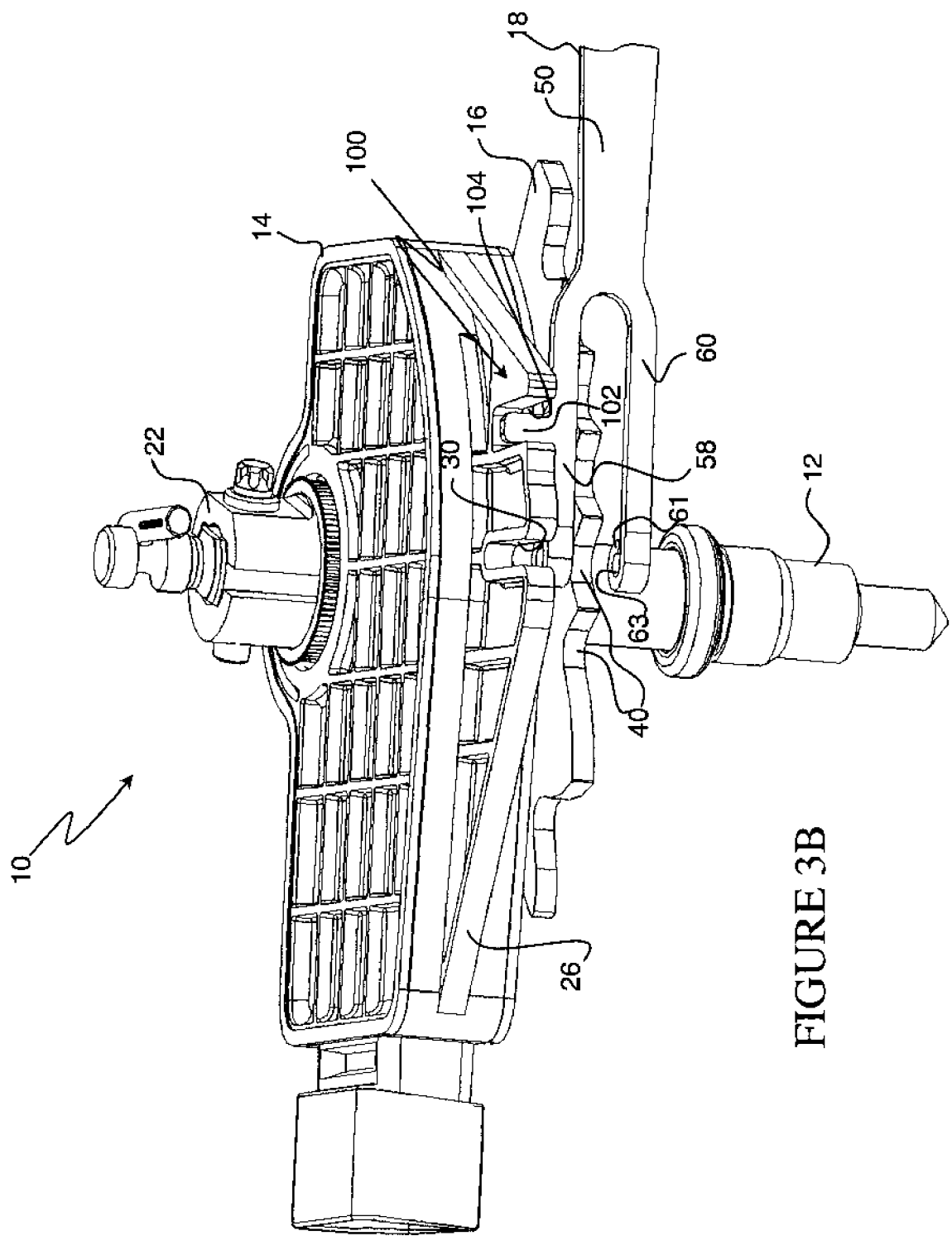
FIG. 3B is an enlarged, isometric, bottom view of the internal mode switch of the present invention during a failure condition.

With reference to FIG. 3B, the gear selector assembly 10 is illustrated in a failure condition wherein the roller assembly 62 has been damaged. As a result the roller assembly 62 has been completely removed from the spring assembly 18. Accordingly, the alignment and tactile feedback that the spring assembly 18 provides will not be available. However, the indexing between the detent lever 16 and the IMS housing 14 is intact if the IMS housing 14 remains stationary. As the roller assembly 62 has failed in this scenario, the IMS housing 14 will not be restricted from movement by the pin 66 (FIG. 3A). However, the tab 102 will engage the secondary slot 104 and keep the IMS housing 14 from moving. Alternatively the roller 66 may still function but the pin 66 may no longer interact with the slot 30. In this failure scenario, the tab 102 and secondary slot 104 prevent the IMS housing 14 from moving while the spring assembly 18 continues to provide alignment and tactile feedback to the operator. Accordingly, the tab 102 and secondary slot 104 must have width tolerances that prevent the IMS housing 14 from moving beyond the tolerances of the indexing system of the IMS housing 14.

The description of the invention is merely exemplary in nature and variations that do not depart from the gist of the invention are intended to be within the scope of the invention. Such variations are not to be regarded as a departure from the spirit and scope of the invention.

What is claimed is:

1. A gear selector assembly comprising:
   a selector shaft;
   an internal mode switch mounted on the selector shaft;
   a detent lever mounted on the selector shaft and rotatable with the selector shaft, wherein the detent lever is indexed relative to the internal mode switch;
   a spring assembly in engagement with the detent lever, the spring assembly having a first member that engages the internal mode switch to prevent the internal mode switch from rotating and having a second member that engages the internal mode switch to prevent the internal mode switch from rotating if the first member does not engage the internal mode switch.

2. The gear selector of claim 1 wherein the first member engages a first slot formed on the internal mode switch.

3. The gear selector of claim 2 wherein the second member engages a second slot formed on the internal mode switch.

4. The gear selector of claim 3 wherein the second slot has a width greater than a width of the first slot.

5. The gear selector of claim 3 wherein the first slot and the second slot are formed on a flange extending out from the internal mode switch.

6. The gear selector of claim 5 wherein the first slot and second slot extend from an edge of the flange toward the internal mode switch.

7. The gear selector of claim 3 wherein the second member is a rectangular tab.

8. The gear selector of claim 7 wherein the first member is a pin.

9. The gear selector of claim 3 wherein the spring assembly includes a pair of arms and the first member and second member extend out from a side of one of the pair of arms.

10. A gear selector assembly comprising:
   a selector shaft;
   an internal mode switch mounted on the selector shaft;
   a flange disposed on a side of the internal mode switch, the flange having a first slot and a second slot, wherein the first slot and the second slot extend from an edge of the flange toward the internal mode switch;
   a detent lever mounted on the selector shaft and rotatable with the selector shaft, wherein the detent lever is indexed relative to the internal mode switch; and
   a spring assembly in engagement with the detent lever, the spring assembly having a first member and a second member, wherein the first member engages the first slot of the flange to prevent the internal mode switch from rotating and the second member engages the second slot of the flange to prevent the internal mode switch from rotating if the first member does not engage the internal mode switch.

11. The gear selector of claim 10 wherein the first member is a pin.

12. The gear selector of claim 10 wherein the spring assembly includes a pair of arms and the first member and second member extend out from a side of one of the pair of arms.

* * * * *